United States Patent
Huang et al.

(10) Patent No.: US 10,960,362 B2
(45) Date of Patent: Mar. 30, 2021

(54) MICROPOROUS POLYVINYL FLUORIDE PLANAR MEMBRANE AND PRODUCTION THEREOF

(71) Applicant: 3M INNOVATIVE PROPERTIES COMPANY, St. Paul, MN (US)

(72) Inventors: Quan Huang, Schwelm (DE); Oliver Schuster, Gevelsberg (DE); Phung Ngoc Duong, Essen (DE); Wolfgang Ansorge, Essen (DE)

(73) Assignee: 3M Innovative Properties Company, St. Paul, MN (US)

( * ) Notice: Subject to any disclaimer, the term of this patent is extended or adjusted under 35 U.S.C. 154(b) by 3 days.

(21) Appl. No.: 15/520,221

(22) PCT Filed: Nov. 2, 2015

(86) PCT No.: PCT/EP2015/075434
§ 371 (c)(1),
(2) Date: Apr. 19, 2017

(87) PCT Pub. No.: WO2016/071271
PCT Pub. Date: May 12, 2016

(65) Prior Publication Data
US 2017/0312703 A1    Nov. 2, 2017

(30) Foreign Application Priority Data

Nov. 3, 2014 (EP) .................................... 14191465

(51) Int. Cl.
| | | |
|---|---|---|
| *B01D 71/34* | (2006.01) | |
| *B01D 61/36* | (2006.01) | |
| *B01D 67/00* | (2006.01) | |
| *B01D 69/02* | (2006.01) | |
| *B01D 69/08* | (2006.01) | |

(52) U.S. Cl.
CPC ........... *B01D 71/34* (2013.01); *B01D 61/364* (2013.01); *B01D 67/0018* (2013.01); *B01D 69/02* (2013.01); *B01D 67/0011* (2013.01); *B01D 69/08* (2013.01); *B01D 2323/08* (2013.01); *B01D 2325/021* (2013.01); *B01D 2325/026* (2013.01); *B01D 2325/04* (2013.01); *B01D 2325/24* (2013.01)

(58) Field of Classification Search
CPC combination set(s) only.
See application file for complete search history.

(56) References Cited

U.S. PATENT DOCUMENTS

| | | | |
|---|---|---|---|
| 4,247,498 A | 1/1981 | Castro | |
| 4,744,240 A | 5/1988 | Reichelt | |
| 5,013,339 A | 5/1991 | Mahoney | |
| 5,834,107 A * | 11/1998 | Wang | B01D 39/083 428/310.5 |
| 6,146,747 A | 11/2000 | Wang | |
| 7,909,178 B2 * | 3/2011 | Ishiodori | B01D 69/02 210/500.23 |
| 8,523,981 B2 | 9/2013 | Huang | |
| 2004/0135274 A1 | 7/2004 | Matsuda | |
| 2005/0058821 A1 | 3/2005 | Smith | |
| 2008/0078718 A1 | 4/2008 | Tada | |
| 2009/0301307 A1 | 12/2009 | Sugiyama | |
| 2011/0290716 A1 | 12/2011 | Tada | |

(Continued)

FOREIGN PATENT DOCUMENTS

| | | |
|---|---|---|
| CN | 1 792 420 | 6/2006 |
| EP | 0 734 759 | 2/1999 |

(Continued)

OTHER PUBLICATIONS

Kesting, R. E., "The Thermal Process", Synthetic Polymeric Membranes, John Wiley & Sons, 1985, pp. 261-264.
Mao Peng et al., "Porous Poly(Vinylidene Fluoride) Membrane with Highly Hydrophobic Surface", *Journal of Applied Polymer Science*. Wiley, US, vol. 98, No. 3, (Jan. 1, 2005) pp. 1358-1363.
Roh, I.J., "Poly(ethylene chlorotrifluoroenthylene) membrane formation via thermally induced phase separation (TIPS)", *Journal of Membrane Science*, Elsevier, vol. 362, Nos. 1-2 (Oct. 15, 2010) pp. 211-220.
"Solution Processing Guide for Polymer Membranes Introduction", *Technical Bulletin, Solvay Advanced Polymers*, (Jan. 1, 2008) XP055184321.

(Continued)

*Primary Examiner* — Ryan B Huang
(74) *Attorney, Agent, or Firm* — Scott A. Baum

(57) ABSTRACT

Hydrophobic flat membrane made from a vinylidene fluoride polymer with a wall, a first surface, and a second surface. The membrane has on its first surface a network structure with open pores and on its second surface a continuous skin in which pores are formed, and adjacent to the skin of the second surface a supporting layer with an isotropic pore structure across the wall thickness, wherein the supporting layer extends over at least 80% of the wall thickness and wherein the pores of the supporting layer have an average diameter of less than 1 μm. The weight average of the molecular weight $M_W$ of the vinylidene fluoride polymer lies in the range from 300 000 to 500 000 daltons, and the polydispersivity $M_W/M_N$ is greater than 5.5.

Figure 1:
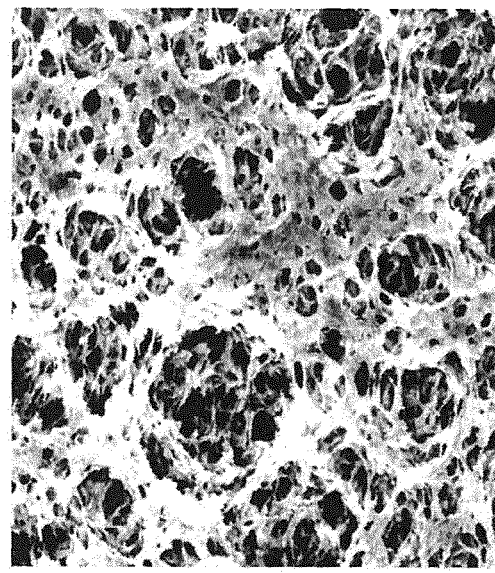

The pores in the skin of the second surface have a closed perimeter in the plane of the skin and an average ratio of the extension in the direction of the longest axis thereof to the extension in the direction of the shortest axis thereof of at most 5. The pores in the first surface and second surface have an essentially isotropic distribution of their orientation. The porosity of the membrane lies in the range from 50 to 90 vol. % and the wall thickness in the range from 50 to 300 μm. The membrane has a maximum separating pore diameter $d_{max}$ in the range from 0.05 to 1.5 μm.

16 Claims, 3 Drawing Sheets

(56) References Cited

U.S. PATENT DOCUMENTS

| | | | |
|---|---|---|---|
| 2013/0255498 A1* | 10/2013 | Shibata | B01D 61/02 96/10 |
| 2014/0039415 A1* | 2/2014 | Schneider | B01D 69/02 604/252 |
| 2015/0328593 A1 | 11/2015 | Kojima | |
| 2016/0089638 A1 | 3/2016 | Schuster | |

FOREIGN PATENT DOCUMENTS

| | | |
|---|---|---|
| EP | 1 063 256 | 12/2000 |
| EP | 1 230 970 | 8/2002 |
| EP | 1 520 874 | 4/2005 |
| EP | 2 052 771 | 4/2009 |
| WO | WO 93/22034 | 11/1993 |
| WO | WO 2013/022660 | 2/2013 |

OTHER PUBLICATIONS

Smolders, C. A., et al, "Liquid-liquid phase separation in concentrated solutions of non-crystallizable polymers by spinodal decomposition", *Kolloid-Z. und Z. Polymere*, vol. 243, No. 1, (1971), pp. 14-20.

\* cited by examiner

MICROPOROUS POLYVINYL FLUORIDE PLANAR MEMBRANE AND PRODUCTION THEREOF

CROSS REFERENCE TO RELATED APPLICATIONS

This application is a national stage filing under 35 U.S.C. 371 of PCT/EP2015/075434, filed Nov. 2, 2015, which claims the benefit of EP Application No. 14191465.5, filed Nov. 3, 2014, the disclosures of which are incorporated by reference in their entirety herein.

The invention relates to a hydrophobic membrane in the form of a flat membrane with a microporous structure and made from a vinylidene fluoride polymer, with a wall with a wall thickness, and a first surface as well as a second surface, wherein the wall of the membrane comprises a microporous supporting layer having a sponge-like, open-pored pore structure that is substantially isotropic across the wall thickness and without finger pores, wherein said supporting layer extends over at least 80% of the wall thickness and comprises pores having an average diameter of less than 1 µm and wherein the membrane has pores in the first surface thereof and second surface thereof.

Microporous polymer membranes are used in the most varied industrial, pharmaceutical, and medical applications for precise filtration. In these applications, membrane separation processes are becoming increasingly important, since these processes offer the advantage that the materials to be separated are not thermally stressed and certainly not damaged. Microfiltration membranes enable for example the removal of fine particles or microorganisms having sizes down to the submicron range, and are therefore suitable for the production of purified water for use in laboratories or for the semiconductor industry. Numerous other applications of membrane separation processes are known from the beverage industry, biotechnology, or from wastewater technology.

Membranes are also increasingly used for membrane distillation. Membrane distillation is a combination of conventional thermal distillation and membrane filtration. The process is a thermally driven separation method in which the separation—as with conventional distillation—takes place due to a phase change. For example, when treating salt water by means of membrane distillation, a hydrophobic membrane is used that forms a barrier for the liquid phase, that is for the salt water. For the vapor phase, i.e. for water vapor, however, the membrane is permeable and water vapor can permeate the pores of the membrane. The driving force for the process is a partial vapor pressure gradient that is usually produced by a temperature difference on the two sides of the membrane. As a rule, the salt water to be treated is heated and guided along one side of the hydrophobic membrane. The other side of the membrane is kept at a lower temperature level to realize the required temperature difference. The process can be performed in such a way that results in condensation on the permeate side of the membrane of the water molecules permeating through the membrane. However, the process can also be performed in such a way that the permeating water molecules are transported away in the form of vapor and condensed in a separate condenser.

The selective property of a membrane that is used for membrane distillation (MD) is therefore based on the retention of liquid water with simultaneous permeability for free water molecules, i.e. for water vapor. In the application it is important that the water to be treated does not permeate the membrane at all or only to an insignificant extent and fill the pores. To prevent the passage of the water to be treated through the membrane and permit only the passage of water vapor or water molecules, it is necessary for the pores of the membrane to remain filled with air. In this case, the hydrostatic pressure on the side of the membrane on which the water to be treated is located must be lower than the permeation pressure, that is, the pressure at which permeation of the water through the membrane begins to take place.

In particular, membranes used in the field of membrane distillation are manufactured from a hydrophobic polymer, such as polytetrafluoroethylene (PTFE), polyvinylidene fluoride (PVDF), or polypropylene (PP). Membrane polymers of this type are simultaneously distinguished by high temperature stability and good chemical resistance, which is required inter alia for the cleaning of these membranes with acids and lyes. At the same time, the membranes must have a high pressure stability for membrane distillation.

U.S. Pat. No. 6,146,747 relates to PVDF membranes that are hydrophilic due to the addition of a hydrophilic polymer, such as polyvinylpyrrolidone in particular. In one embodiment, the membranes of U.S. Pat. No. 6,146,747 have an isotropic structure extending across at least 80% of the wall thickness. The pores of the membranes disclosed in U.S. Pat. No. 6,146,747 are minimal on the membranes' first surface and maximal on their second surface. The isotropic area on the inside has relatively large pores with pores in the range of 10 µm and has a filament-like network structure. The production of the membrane takes place from solutions conditioned to a temperature slightly above room temperature, wherein the coagulation is triggered by submersion in a non-solvent that is not capable of dissolving the PVDF. The process is therefore based on non-solvent-induced phase separation.

EP-0 734 759 B1 discloses membranes made from PVDF that are manufactured using a membrane formation process with a thermally induced liquid-liquid phase separation. The membranes show a fiber-like structure with fiber- or filament-like strands that are connected at multiple positions separated from each other along their longitudinal extension. The membranes of EP-0 734 759 B1 allow the passage of water and, according to the examples, have water permeabilities up to 300 ml/(min·m²·bar). A disadvantage of membranes of this type is that, due to the structure of fiber- or filament-like strands, spaces between the filament-like strands and therefore the sizes of the pores can change under pressure.

EP-A-1 520 874 relates to membranes inter alia made from polyvinylidene fluoride, the wall of which is made of a network-like structure in combination with a structure formed by spherical or nearly spherical particles that are arranged in layers. The objective of EP-A-1 520 874 is to provide membranes that allow the passage of water, i.e. with a high permeability for water. The membranes of EP-A-1 520 874 can also be manufactured in a thermally induced phase separation process.

U.S. Pat. No. 5,013,339 discloses PVDF membranes that, depending on the manufacturing method, are intended for use in microfiltration, ultrafiltration, membrane distillation, or dialysis and can have an isotropic or anisotropic structure over the membrane cross-section. The method for manufacturing these membranes is also based on a thermally induced phase separation process wherein a glyceryl monoacetate, glyceryl diacetate, or a glyceryl triacetate, or mixtures thereof, can be used as solvent system, to which glycerol can be added if necessary. Cooling and coagulation take place in a non-solvent for the polyvinylidene fluoride, which is preferably water.

US-A-2005/0058821 describes the manufacture of PVDF membranes by means of a thermally induced phase separation process from solutions of polyvinylidene fluoride in glyceryl triacetate. The PVDF membranes forming in the process have a structure formed by aggregations of particles connected by fibrils, or by aggregations of spherulites.

US-A-2004/0135274 relates to membranes made from vinylidene fluoride homopolymers or copolymers which are likewise produced via a method with thermally induced phase separation. The membranes from US-A-2004/0135274 have an isotropic network structure with three-dimensional branchings in random spatial directions, and the targeted membranes are those which have porous surfaces. The membranes of US-A-2004/0135274 are used for filtration, such as to separate particles from liquids, and have a high permeability for water. In cases in which the cooling medium has a low affinity for vinylidene fluoride homopolymers or copolymers, as is the case for example with water, ethylene glycol, or decalin, the surface of the resulting membrane has a skin-like structure or a structure consisting of a particulate material. With high solvent affinity for the vinylidene fluoride homopolymer or copolymer, according to the statements of US-A-2004/0135274, open-pored surfaces are obtained. With the method of US-A-2004/0135274, solidification of the polymer phase takes place by means of crystallization.

EP-A-2 052 771 relates to inter alia flat membranes based on polyvinylidene fluoride that have round or oval pores on one surface and slit-shaped pores on their other surface, which are arranged parallel to each other. The membranes of EP-A-2 052 771 are manufactured by means of a method with thermally induced phase separation. This method begins with a polymer solution that contains, in addition to a polyvinylidene fluoride polymer and a solvent for this polymer, inorganic particles to adjust the micropores of the porous membrane as well as means for improving the tolerance of the polymer and solvent. After solidification and before extraction of the solvent, the particles, and the means for improving the tolerance of the polymer and solvent, the porous membranes are drawn.

The object of the invention is to provide a membrane suitable for membrane distillation that can be used for membrane distillation tasks in aqueous media and have a high permeability for water vapor but do not allow the permeation of water when applying high water pressures. The membrane should also be suitable for tasks in the field of membrane filtration and, in particular, in the field of microfiltration.

The object according to the invention is achieved by a hydrophobic membrane in the form of a flat membrane that is made from a vinylidene fluoride polymer, wherein the membrane has a wall with a wall thickness, a first surface, and a second surface opposite the first surface, wherein the membrane has a network structure with open pores on the first surface thereof and a continuous skin on the second surface thereof, in which pores are formed, wherein the membrane, adjacent to the skin of the second surface, has a supporting layer having an open-pored, microporous, sponge-like pore structure that is substantially isotropic across the wall thickness, the supporting layer extending over at least 80% of the wall thickness and comprising pores having an average diameter of less than 1 µm, characterized in that the vinylidene fluoride polymer forming the flat membrane has a weight-average molecular weight $M_W$ in the range from 300 000 to 500 000 daltons and a polydispersivity, given by the ratio of the weight-average molecular weight $M_W$ and the number average $M_N$ of the molecular weight, that is greater than 5.5, the pores in the skin of the second surface have an island shape, i.e. have a closed perimeter in the plane of the skin, the pores in the skin of the second surface having an average ratio of the extension in the direction of the longest axis thereof to the extension in the direction of the shortest axis thereof of at most 5, and the pores in the first surface and second surface having an essentially isotropic distribution of their orientation when viewed perpendicular to the surface, the porosity of the membrane lies in the range from 50 to 90 vol. % and the wall thickness in the range from 50 to 300 µm, and the membrane has a maximum separating pore diameter $d_{max}$ in the range from 0.05 to 1.5 µm determined according to the bubble point method.

Due to the combination according to the invention of the structural characteristics including in particular the pore size and pore structure across the wall thickness, the open-pored structure of the surfaces, the porosity and the membrane dimensions, for applications in the field of membrane distillation, high mass flows for water vapor are achieved without a breakthrough of water through the membrane. In addition, the inventive membrane is outstandingly suitable for filtration tasks.

The present flat membrane is hydrophobic, i.e. water repellent. On the second surface of the present hydrophobic flat membrane, a contact angle of over 90° in relation to water results. This is particularly important for applications in the field of membrane distillation, since by this means a high reliability in the use of membranes to prevent any penetration of water, and therefore a breakthrough of water through the membrane, can be achieved. The membrane therefore preferably consists of polyvinylidene fluoride and in particular does not contain any hydrophilic additives such as polyvinylpyrrolidone, which as a rule is added to the known polyvinylidene fluoride membranes.

As previously stated, the membrane has a continuous skin on the second surface thereof, in which pores are formed. According to the invention, the pores in the second surface have a closed perimeter in the plane of the skin. This means that the pores are formed like islands in the surrounding skin, i.e. in an island shape and surrounded by the skin. The pores or openings in the second surface of the present membrane and the skin surrounding them have an island-sea structure, wherein the pores ("islands") are arranged as a discontinuous phase in the skin surrounding them, which represents a continuous phase ("sea") with regions and webs surrounding the pores or openings, which regions and webs lie on the second surface in one plane.

Due to the island-shaped formation of the pores in the second surface with a closed perimeter in the plane of the skin, the second surface has a different structure than the first surface, which has a network-like structure in which spaces between the filament-like webs made from polymer material form a pore system.

The network structure on the first surface corresponds to the surface structure as the membranes of US-A-2004/0135274, for example, have. The structure of the two surfaces of the present membranes differs from particulate or spherulitic structures, in which the polymer structure of the membrane is formed by spherical or spherulitic particles which can be connected to each other via fibril-like webs. Membranes with surface structures of this type are shown in WO-A-93/22034 for example. It was found that a comparatively smooth structure of the second surface of the present membrane is favorable in application with respect to a low degree of fouling or with respect to a reduction or avoidance of the lodging of particles.

The special structure of the inventive membrane, in particular its microporous supporting layer with a sponge-like, open-pored pore structure that is isotropic across the wall thickness, said supporting layer extending over at least 80% of the wall thickness and comprising pores having an average diameter of less than 1 µm, is the basis of the high strength and good mechanical characteristics of the membranes in application. Due to this structure, the inventive membranes differ from membranes having an asymmetric structure in which the pore size changes even within the supporting layer, from membranes that have cavern-like pores in the walls thereof, and also from membranes whose surfaces and/or supporting structure have a particulate or spherulitic structure. These membranes from the prior art often have insufficient mechanical characteristics, such as insufficient breaking strength and elongation at rupture, due to their different structure.

The homogeneous, isotropic structure of the supporting layer of the inventive membrane effects a uniform distribution of the loads across the membrane wall during mechanical stress, which distribution leads to high values of pressure stability, breaking strength, and elongation at break. With regard to the mechanical characteristics, it is simultaneously important that the size of the pores in the supporting layer remains in the stated range. In particular, the supporting structure has no finger pores, which are also often designated as caverns or macrovoids and can have a size of several µm. Finger pores of this type show a disadvantageous wetting behavior that results in an early penetration of water into the pores. Instead, the inventive membrane has pores in the supporting layer having an average diameter of less than 1 µm such that the supporting layer is thus relatively finely pored. Preferably, the average diameter of the pores in the supporting layer is less than 0.5 µm.

The pore structure in the supporting layer is substantially isotropic according to the invention. By this it is understood on the one hand that the average diameter of the pores in the supporting layer is substantially constant when viewed across the wall thickness using a scanning electron microscopic examination at 2000× magnification. Expressed another way, the region of the isotropic support structure can be viewed as a region in which flow channels with substantially constant diameters are present across the wall thickness. Naturally, the fact that the actual size of the pores in the isotropic supporting layer varies somewhat should also be taken into account, i.e. the supporting layer has, to a certain extent, a pore size distribution as is applicable for every membrane structure, even if the structure appears isotropic in the scanning electron microscopic examination. Within the context of the present invention, therefore, a substantially constant average pore diameter is understood as one that does not change by more than +/−50% in the extension of the supporting layer across the membrane wall.

On the other hand, a substantially isotropic pore structure is simultaneously to be understood such that, even if the individual pores can also have an irregular or oblong shape, when averaged over all the pores the pores in the spatial directions parallel and perpendicular to the surfaces have substantially the same extension, whereby deviations among the extensions in the individual spatial directions of up to 20% are included. The inventive membranes thereby have a cellular structure, which exhibits pores surrounded by pore walls, the pores having in part spherical and ellipsoidal shapes and connected to each other via openings in their walls. The present structure thus differs for example from network structures having randomly oriented three-dimensional branchings in the spatial directions, such as the microporous membranes from US-A-2004/0135274 or EP-A-0 734 759, to which explicit reference is made at this point regarding this disclosure. On the other hand, the pore structure of the membranes of the present invention differs from particulate or spherulitic structures, in which the polymer structure of the membrane is formed by spherical or spherulitic particles, which can be connected to each other via fibril-like webs. Membranes with structures of this type are described, for example, in EP-A-1 230 970 or WO-A-93/22034 or disclosed in US-A-2004/0135274 in FIG. 6, to which explicit reference is made at this point regarding this disclosure. Likewise, the structure of the inventive membrane is different from the fiber-like structures with fiber- or filament-like strands, such as those the membranes of EP-A-0 734 759 B1 have, to which explicit reference is made at this point regarding this disclosure.

The defined homogeneous, isotropic structure of the supporting layer with a microporous pore structure, the pores thereof having an average diameter of less than 1 µm, in conjunction with a porous first and second surface, is crucial for high permeabilities for gaseous media such as water vapor in application of the inventive membrane in membrane distillation. The relatively fine-pored supporting layer with pores having an average diameter of less than 1 µm and preferably less than 0.5 µm thereby has an advantageous effect with respect to a high mechanical stability and in particular a high pressure stability of the flat membrane in application.

Preferably, the membrane of the invention has a mass flow for water vapor, or a transmembrane flow for water vapor, of at least 35 l/(m$^2$·h) and particularly preferably of at least 50 l/(m$^2$·h), determined by means of a module of the flat membrane with a membrane area of 40 cm$^2$ at a salt water circuit temperature of 80° C. and a distillate circuit temperature of 30° C., a volume flow in the circuits of 200 l/h, a pressure level in the circuits of 500 mbar at the inlet to the flat membrane module, and a salt concentration in the salt circuit of 36 g/l.

To realize high transmembrane flows for water vapor, it is advantageous if a high partial vapor pressure gradient across the membrane wall exists in the application for membrane distillation. Due to the balanced combination with regard to its structural characteristics, the membrane according to the invention has a high mechanical strength and is therefore capable of withstanding differential pressures occurring in application in which a vacuum often exists on the permeate side. In a preferred embodiment, the membrane according to the invention has an elongation at break of at least 50%. In a further preferred embodiment, it has a breaking strength of at least 200 cN/mm$^2$. Especially preferably, it has an elongation at break of at least 50% in conjunction with a breaking strength of at least 200 cN/mm$^2$.

It has been demonstrated that the polyvinylidene fluoride used has a decisive effect on the mechanical properties and on the performance data of the membrane. It was found that for membranes in which a polyvinylidene fluoride with an insufficient molecular weight, i.e. with a weight-average molecular weight in the range below $M_W$=300 000 daltons, was used, the elongation at break and therefore the strength of the membranes obtained thereby were insufficient. It was also shown that in membranes made from a polyvinylidene fluoride with a weight-average molecular weight in the range from 300 000 to 500 000 daltons but a polydispersivity below 5.5, a change in the pore structure can be recognized in which the pores are connected to each other to a lesser extent, that is they exhibit a lower interconnectivity. As a result, the obtained transmembrane flows for isopropyl alcohol decrease. Preferably, the structure of the vinylidene fluoride polymer forming the membrane has a polydispersivity that is greater than 6. The polydispersivity is preferably at most 10. It was observed that in membranes made from a polyvinylidene fluoride with a weighted-average molecular weight in the range from 300 000 to 500 000 daltons but with a polydispersivity that is greater than 10, the obtained membrane structures can deviate from the membrane desired according to the invention.

A mixture of two polyvinylidene fluorides having different average molecular weights has proven suitable as a polyvinylidene fluoride. A mixture of this type can preferably be a mixture of a polyvinylidene fluoride which is available under the designation Solef® 6020 (Solvay), as well as of a polyvinylidene fluoride which is available under the designation Hylar® 461 (also Solvay), or of a mixture of similar polyvinylidene fluorides, wherein the previously cited conditions with regard to the weight-average molecular weight $M_W$ as well as with regard to the polydispersivity $M_W/M_N$ must always be observed. The polyvinylidene fluoride available under the designation Solef® 6020 has a weight-average molecular weight $M_W$ of 552 000 daltons and a polydispersivity of 5.1. For the polyvinylidene fluoride available under the designation Hylar® 491, a weight-average molecular weight $M_W$ of 271 000 daltons and a polydispersivity of 5.97 were determined. A mixture of these two polyvinylidene fluorides in a ratio 50:50, with a weight-average molecular weight $M_W$ of 457 000 daltons and a polydispersivity of 6.92, results in values that lie within the range required according to the invention. With respect to the method for determining the weight-average molecular weight and the polydispersivity, reference is made to the subsequent discussion.

According to the invention, the flat membrane has a maximum separating pore diameter $d_{max}$ in the range from 0.05 to 1.5 µm determined according to the bubble point method. Preferably, the separating pore diameter $d_{max}$ lies in the range from 0.1 to 1 µm. To withstand pressures occurring in applications in membrane distillation without water permeating the membrane wall, the membrane according to the invention in a particularly preferred embodiment has a maximum separating pore diameter $d_{max}$ in the range from 0.3 to 0.8 µm determined according to the bubble point method. With maximum separating pore diameters above 0.8 µm, an increasing risk exists that, at the operating pressures prevailing in the application as well as their fluctuations and taking into account the temperature effects, water enters and permeates the membrane. Maximum separating pore diameters under 0.3 µm increasingly effect a decrease in the achievable transmembrane flows for water vapor. Most suitable for applications in membrane distillation is a flat membrane according to the invention with a maximum separating pore diameter $d_{max}$ in the range from 0.3 to 0.6 µm.

In a further particularly preferred embodiment, the membrane has a nominal pore in the range from 0.1 to 0.45 µm. In this case, the nominal pore is defined by the capacity of the membrane to retain specific microorganisms. A membrane with a nominal pore of 0.2 µm, for example, retains bacteria of the genus *Brevundimonas diminuta*, a membrane with a nominal pore of 0.45 µm retains bacteria of the genus *Serratia marcescens*, etc. An inventive flat membrane with a nominal pore of 0.2 µm is particularly suitable. A flat membrane of this type can best be used for the sterile filtration of liquids, where, due to the high temperature stability of the material forming the membrane, applications at higher process temperatures are also possible. The testing and determination of the nominal pore sizes are described in HIMA Specification No. 3, Vol. 4, 1982 (Health Industry Manufacturers Association), for example.

The membrane according to the invention has a porosity in the range from 50 to 90 vol. %. Below 50 vol. %, the application in membrane distillation shows a significant decrease in the achievable transmembrane flows for water vapor. In applications in the field of filtration, membranes with porosities below 50 vol. % also show disadvantages, since the achieved flow rates through the membrane are insufficient. Over 90 vol. % on the other hand, it has been shown that the mechanical properties of the membrane decrease. It is advantageous if the porosity of the membrane lies in the range from 70 to 85 vol. %.

Achieving high transmembrane flows for water vapor also requires the membrane wall to have a high overall permeation capacity for media. Particularly crucial for this are porosity, pore structure, pore size, the distribution and permeability of the pores in the wall, as well as the surface porosity. The transmembrane flow for isopropyl alcohol is considered the measure of high permeability for hydrophobic membranes. As previously stated, the present membrane has a high permeability and in a preferred embodiment has a transmembrane flow for isopropyl alcohol in the range from 3 to 15 ml/(cm²·min·bar) and particularly preferably a transmembrane flow for isopropyl alcohol in the range from 4 to 10 Ml/(cm²·min·bar).

For the present hydrophobic flat membrane, a direct measurement of a transmembrane flow for water is not possible, since the pores of the membrane cannot be wetted by water. However, a measurement can be performed in such a way that the membrane is first flushed with an alcohol solution, e.g. based on isopropyl alcohol, and in subsequent flushing processes the alcohol solution is replaced with water. It was found that the transmembrane flows for water are higher than the transmembrane flows for isopropyl alcohol by a factor of about 2 to about 2.5.

According to the invention, the membrane has a wall thickness in the range from 50 to 300 µm. By also maintaining the further structure properties required according to the invention on the one hand, the desired high transmembrane flows for water vapor can thereby be realized. On the other hand, the membrane has a sufficiently high mechanical strength. In addition, heat losses via the membrane wall that result in a loss in efficiency in applications in membrane distillation are kept low. Preferred is a wall thickness in the range from 60 to 150 µm and particularly preferred in the range from 80 to 140 µm.

In a preferred embodiment, the pores in the second surface of the membrane have a maximum diameter of 3 µm. With such a pore diameter on the second surface, when a flow is applied in membrane distillation applications on the side of the second surface, a significantly decreased risk of water entry into the membrane is shown. In this case, the diameter of the pores with a non-circular shape is to be understood as the length of the shorter main axis of the pores. It is particularly preferred that the pores in the second surface of the inventive flat membrane have a maximum diameter of 2 µm. Particularly advantageous is a maximum pore diameter of 1.0 µm, wherein flat membranes with a maximum pore diameter of 0.5 µm are best suited for applications in the field of membrane distillation.

In a preferred embodiment, the pores in the second surface are smaller than the pores in the first surface. In particular in applications in membrane distillation, in which the first surface of the flat membrane is the permeate side, in which a gaseous phase is present on the permeate side of the membrane, and in which in particular a vacuum exists on the permeate side as well, it has been found that larger pores in the first surface are advantageous for transporting the permeate away from the membrane.

In this case, the surface porosity of the first surface of the hydrophobic flat membrane is higher than the surface porosity of the second surface. In a further preferred embodiment, the surface porosity of the second surface is a maximum of 10% and particularly preferably a maximum of 5%. This can also further reduce the risk for the penetration of water in membrane distillation.

It has proven to be advantageous with respect to the temperature stability of the membrane, i.e. in particular with respect to any shrinking of the membrane at higher temperatures associated with a change in the pore structure, if the membrane has not been subjected to significant drawing during its production. A high degree of drawing affects the pores on the surface, which in a direction of extension of the membrane have a significantly greater diameter than in a direction perpendicular thereto. The pores in the second surface of the membrane therefore have an average ratio of their longest axis to their shortest axis of at most 5 and preferably of at most 3. The pores in the second surface and the pores in the first surface when viewed perpendicular to the respective surface have an essentially isotropic distribution of their orientation, i.e. do not have a preferred orientation in one direction. In a preferred embodiment, the pores in the first surface have an average ratio of their longest axis to their shortest axis of at most 5 and preferably of at most 3.

The flat membrane according to the invention can be produced by a method in which the membrane formation takes place via a thermally induced phase separation process. With a method of this type, a homogeneous casting solution of a polymer component made from at least one vinylidene fluoride polymer is prepared in a solvent system, wherein the casting solution of the polymer component and solvent system has on cooling a critical demixing temperature and a solidification temperature, and a miscibility gap below the critical demixing temperature in the liquid state of aggregation, and wherein the solvent system contains a compound A and a compound B, which are liquid and can be mixed homogeneously with each other at the dissolving temperature, and wherein a solvent for the polymer component is selected for compound A and compound B is a non-solvent for the polymer component. The homogeneous casting solution is formed into a film with a first surface and a second surface in a forming tool, which has a tool temperature above the critical demixing temperature, and the first side of the film is placed onto a thermally conditionable carrier that is conditioned to a cooling temperature below the solidification temperature. By this means, the film on the conditionable carrier cools at such a rate that a thermodynamic non-equilibrium liquid-liquid phase separation into a polymer-rich and a polymer-poor phase takes place, and subsequently, on passing below the solidification temperature, solidification of the polymer-rich phase takes place, forming a membrane structure. The second side of the film is brought into contact with a gaseous atmosphere. After formation of the membrane structure, the film is drawn off the carrier and at least a part of the solvent system removed from the film to obtain the flat membrane.

Preferably, the method for producing the inventive hydrophobic membrane in the form of a flat membrane made from a vinylidene fluoride homopolymer or copolymer comprises at least the following steps:
a) Preparing a homogeneous casting solution of 20-30 wt. % of a polymer component made from at least one vinylidene fluoride polymer in 80-70 wt. % of a solvent system, wherein the casting solution of the polymer component and solvent system has on cooling a critical demixing temperature and a solidification temperature, and a miscibility gap below the critical demixing temperature in the liquid state of aggregation, and wherein the solvent system contains a compound A and a compound B, which are liquid and can be mixed homogeneously with each other at the dissolving temperature, and wherein a solvent for the polymer component is selected for compound A and compound B is a non-solvent for the polymer component,
b) Forming of the casting solution into a film with a first surface and a second surface in a forming tool, which has a tool temperature above the critical demixing temperature, and
c) Placing the first side of the film onto a conditionable carrier, which is conditioned to a cooling temperature below the solidification temperature, resulting in cooling of the film via the conditionable carrier at such a rate that a thermodynamic non-equilibrium liquid-liquid phase separation into a polymer-rich and a polymer-poor phase takes place, and subsequently, on passing below the solidification temperature, solidification of the polymer-rich phase takes place, forming a membrane structure; at the same time
d) Bringing the second surface of the film into contact with a gaseous atmosphere,
e) Drawing the film with the formed membrane structure from the carrier,
f) Removing at least part of the solvent system from the film to obtain the flat membrane,
wherein the method is characterized in that
the polymer component has a weight-average molecular weight $M_W$ in the range from 300 000 to 500 000 daltons and a polydispersivity $M_W/M_N$, given by the ratio of the weight-average molecular weight $M_W$ and the number average $M_N$ of the molecular weight, that is greater than 5.5.

Surprisingly, it has been shown that by maintaining these process conditions, the membrane of the invention made from a vinylidene fluoride homopolymer or copolymer with a microporous, sponge-like, and open-pored structure can be obtained, which adjacent to the skin of the second surface thereof has a supporting layer with an essentially isotropic pore structure across the wall thickness, which extends over at least 80% of the wall thickness and has pores with an average diameter of less than 1 µm, and has a continuous skin on the second surface thereof, in which island-shaped pores are formed and have a closed perimeter in the plane of the skin. It has been shown that in particular the selection of the vinylidene fluoride homopolymer or copolymer with regard to the molecular weight as well as to the polydispersivity and the conditions during cooling have an effect on the formation of the membrane structure.

The method according to the invention is based on a thermally induced phase separation process with liquid-liquid phase separation. According to the invention, the polymer component and the solvent system containing the compounds A and B form a binary system which in the liquid state of aggregation has a range in which the complete system is present as a homogeneous solution, and a range in which it has a miscibility gap. If a system of this type is cooled from the range in which it is present as a homogeneous solution to below the critical demixing or phase separation temperature, then initially a liquid-liquid demixing or phase separation into two liquid phases takes place, namely into a polymer-rich phase and a polymer-poor phase. During further cooling to below the solidification temperature, the polymer-rich phase solidifies into the three-dimensional membrane structure. Within the context of the present invention, the solidification temperature of the system comprising the polymer component and compounds A and B lies preferably above 50° C. and particularly preferably above 100° C. If the cooling rate is sufficiently high that the liquid-liquid phase separation cannot take place under thermodynamic equilibrium conditions but instead takes place under thermodynamic non-equilibrium conditions, yet on the other hand is still relatively slow, the liquid-liquid phase separation takes place approximately simultaneously with the formation of a large number of liquid droplets of essentially the same size.

The resulting polymer structure then has a sponge-like, cellular, and open-pored microstructure. The different types of formation of such sponge-like, microporous structures using processes with thermally induced liquid-liquid phase separation are extensively described in DE-A 27 37 745, to which explicit reference is made regarding this disclosure, and presented e.g. in R. E. Kesting: "Synthetic Polymeric Membranes", John Wiley & Sons, 1985, pp. 261-264.

The vinylidene fluoride polymer forming the flat membrane of the invention or used in the production method thereof to form the membrane can be a vinylidene fluoride homopolymer or a vinylidene fluoride copolymer. Copolymers of vinylidene fluoride with at least one further component, selected from the group of vinylidene fluorides, ethylene tetrafluorides, propylene hexafluorides, ethylene trifluorides, ethylene trifluoride chlorides, vinyl fluoride, and ethylene are possible vinylidene fluoride copolymers. Preferably, mixtures of two or more vinylidene fluoride homopolymers and/or copolymers can be used. Within the context of the present invention, vinylidene fluoride homopolymers are preferred.

According to the invention, the polymer component used, made from at least one vinylidene fluoride homopolymer or copolymer, has an average molecular weight $M_W$ in the range from 300 000 to 500 000 daltons measured using gel permeation chromatography and a polydispersivity of at least 5.5. In the case of the preferred use of mixtures of two or more vinylidene fluoride homopolymer and/or copolymer components, said components can preferably have different average molecular weights, such that adjusting the mixture can change the weight-average molecular weight and the polydispersivity.

As previously stated, the polyvinylidene fluoride used and in particular its molecular weight and the polydispersivity of its molecular weight have a decisive effect on the mechanical properties and the performance data of the membrane, but also on the pore structure, which forms during production of the flat membranes. It was found that using a polyvinylidene fluoride polymer component with a weight-average molecular weight in the range from 300 000 to 500 000 daltons but a polydispersivity below 5.5 results in membranes in which the pores exhibit a lower interconnectivity and an increased tortuosity. Preferably, the polyvinylidene fluoride polymer component used has a polydispersivity that is greater than 6. The polydispersivity is preferably at most 10. During production of membranes from a polyvinylidene fluoride component with a weighted-average molecular weight in the range from 300 000 to 500 000 daltons but a polydispersivity greater than 10, it has been observed that the then present very different chain lengths of the vinylidene fluoride polymer molecules in the present method with thermally induced phase separation can result in very different precipitation kinetics and, for example, precipitation at very different temperatures. This can have an effect on the forming membrane structures and can prevent the desired membrane structures from being obtained.

In so far as it is necessary, the vinylidene fluoride homopolymers or vinylidene fluoride copolymers can also contain additives such as antioxidants, UV absorbers, lubricants, or nucleating agents.

The employed compositions of the polymer component, compound A, and compound B, wherein compounds A and B together form the solvent system, must be jointly convertible into a single, homogeneous liquid phase and have a critical demixing temperature, below which a phase separation into two liquid phases occurs. This temperature, however, is higher than the demixing temperature of a solution that contains equal proportions of polymer, yet only contains compound A as the solvent system. For systems of polymer component/compound A with a miscibility gap in the liquid state of aggregation, the critical demixing temperature is thus raised by the addition of compound B. The addition of compound B enables a targeted control of the pore size and the pore volume in the porous structures obtained.

Compounds of a type are to be used for compound A that are solvents for the polymer component and in which this polymer component is dissolved completely to form a homogeneous solution during heating to at most the boiling point of this compound. According to the invention, a compound is selected as compound B which is a non-solvent for the polymer component. A non-solvent for the polymer component is generally understood within the context of the present invention to be a compound which does not dissolve the polymer component, at a concentration of 1 wt. % in the non-solvent, to form a homogeneous solution during heating to at most the boiling point of this non-solvent.

Compound A can thereby have been mixed with further solvents. Compound B can also be used in a mixture with additional non-solvents. As a result, in the context of the present invention, compound A is understood as not only a single compound but also as a mixture of different solvents, as long as the overall effect as a solvent remains unchanged. Likewise, compound B is also understood as a mixture of different non-solvents, as long as the effect as a non-solvent remains unchanged.

As compound A, i.e. as the solvent for the at least one vinylidene fluoride homopolymer or copolymer, preferably glyceryl triacetate, glyceryl diacetate, 2-(2-butoxyethoxy-)ethyl acetate, dibutyl phthalate, adipic acid diethyl ester, adipic acid dibutyl ether, butyl diglycol acetate, butyl glycol acetate, glycol diacetate, propylene carbonate, butyrolactone, or ε-caprolactam, or mixtures of the compounds mentioned are used. Particularly preferably, glyceryl triacetate or a mixture of glyceryl triacetate and ε-caprolactam is used for compound A. As compound B, i.e. as the non-solvent for the polymer component, dioctyl adipate, glyceryl monoacetate, glycerol, glycol, diglycol, or castor oil, or mixtures thereof are well suited. Particularly preferred is the use of dioctyl adipate or castor oil or mixtures thereof.

The proportion of polymer required for the production of the membrane as well as the ratio of compound A to compound B in the solvent system can be determined by the generation of phase diagrams by means of simple tests. Phase diagrams of this type can be developed according to known methods, as described e.g. by C. A. Smolders, J. J. van Aartsen, A. Steenbergen, "Kolloid-Z. and Z. Polymere", 243 (1971), pp. 14-20. As a rule, for a predetermined solvent A, the proportion of compound B in the mixture of the polymer component, compound A, and compound B is dependent on the strength of the non-solvent, i.e. of compound B.

The proportion of compound B in the solvent system is preferably 50 to 70 wt. % and particularly preferably 55 to 65 wt. %.

According to the invention, the concentration of the at least one vinylidene fluoride homopolymer or copolymer in the homogeneous casting solution lies between 20-30 wt. % and the concentration of the solvent system between 80-70 wt. %. In a preferred embodiment of the inventive method, the proportion of the polymer component is 23-27 wt. % and the proportion of the solvent system, consisting of compounds A and B, is 78-73 wt. %. If necessary, additional substances can be added to the polymer component, compounds A and B, or also the polymer solution, such as antioxidants, nucleating agents, extenders, components for improving biocompatibility i.e. the blood compatibility during use of the membrane in oxygenation, e.g. vitamin E, and the like.

To form the flat membrane, the casting solution is formed into a film with a first surface and a second surface in a forming tool, which has a tool temperature above the critical demixing temperature. The forming of the film can take place in a known way, for example by means of conventional forming tools like sheeting dies, casting molds, or doctor blades.

The first side or surface of the film is placed onto a thermally conditionable carrier that moves at the process speed in the production direction of the film. With regard to the conditionable carrier, conventional carriers can be used, from which the formed membrane can later be drawn off. For example, coated papers or metal belts can be used. The thermally conditionable carrier is preferably a thermally conditionable rotating roller, i.e. a casting roller, onto which the film is cast. The conditionable carrier has a temperature which is lower than the temperature of the forming tool and far enough below the solidification temperature that the film is cooled via the conditionable carrier at such a rate that starting from the first side or surface of the film a thermodynamic non-equilibrium liquid-liquid phase separation into a polymer-rich and a polymer-poor phase takes place, and subsequently, on passing below the solidification temperature, solidification of the polymer-rich phase takes place, forming the membrane structure. Preferably, the carrier is conditioned to a temperature in the range from 30 to 80° C. and particularly preferably to a temperature in the range from 40 to 70° C. In this way, after placement of the formed film onto the conditionable carrier, cooling beginning with the first side of the film to a temperature below the demixing temperature takes place to initiate phase separation. The residence time of the film on the conditionable carrier is preferably 5 to 15 s.

The second surface of the film, which is not placed on the conditionable carrier, is brought into contact with a gaseous atmosphere. In a preferred embodiment, the gaseous atmosphere has a temperature in the range from 20 to 25° C. It is likewise preferred if the gaseous atmosphere has a relative humidity in the range from 45 to 65%. Due to the conditions of the gaseous atmosphere, the properties of the membrane later obtained can be influenced on the second surface, such as the surface porosity thereof or the average size of the pores in the second surface.

After cooling and sufficient solidification of the polymer or membrane structure, the film located on the carrier is drawn off the carrier. The formation and solidification of the membrane structure can be evaluated based on a change in the appearance of the film from a clear film to an opaque film.

In a preferred embodiment, the conditionable carrier is a conditionable casting roller, which with a part of its perimeter on the bottom is immersed in a bath filled with a liquid cooling medium. In this case, in a further preferred embodiment the film is drawn off the carrier, i.e. the casting roller, above the bath surface and is itself not immersed in the cooling medium.

Immersion of the casting roller into the bath with the liquid cooling medium wets the surface of the casting roller and during rotation thereof draws a thin film of the cooling medium from the bath. The surface of the casting roller is therefore wetted with a film of the cooling medium such that the casting solution film is not placed onto a dry casting roller but rather onto a casting roller wetted with the cooling medium. This has an effect on the formation of the surface structure on the first side of the film or the resulting membrane and fosters the formation of an open-pored network structure on the first surface of the resulting flat membrane.

Naturally, the cooling medium must act as a non-solvent for the polymer component at the cooling temperature to allow the formation of the membrane structure and prevent full or partial dissolving of the polymer component on the first surface. Preferably, the liquid cooling medium acts inertly with regard to the polymer component, i.e. does not react chemically with the polymer component. Preferably, the liquid cooling medium contains a solvent and a non-solvent for the polymer component.

Preferably, the solvent and/or the non-solvent contained in the cooling medium are compound A and compound B, respectively, which are also used to produce the homogeneous solution of the polymer component and solvent system. In this case, it can be advantageous if the ratio of compound A to compound B in the liquid cooling medium is similar to the ratio of these components in the casting solution. Particularly preferably, the cooling medium contains dioctyl adipate or castor oil or mixtures thereof as the non-solvent. Particularly preferably, the solvent contained in the cooling medium is a glyceryl triacetate or a mixture of a glyceryl triacetate and ε-caprolactam.

Cooling and solidification can also take place in multiple stages, for example by using multiple conditionable rollers arranged one after another, over which the film is guided, after appreciable solidification of the membrane structure and after drawing off from the first roller, for further cooling and solidification. In this case, the rollers arranged one after another in the direction of movement of the film can have decreasing temperatures.

Next, at least a part of the solvent system, i.e. a part of compounds A and B, must be removed from the film to obtain the flat membrane. Removal of the solvent system can take place for example through extraction. Preferably extracting agents of a type are used thereby that do not dissolve the polymer or polymers but can be mixed with compounds A and B. Subsequently, drying at increased temperatures can be necessary in order to remove the extracting agents from the membrane. Usable extracting agents are acetone, methanol, ethanol, and preferably isopropyl alcohol.

The invention is to be explained in more detail on the basis of the following examples and figures. The content of the figures is as follows:

FIG. 1: Scanning electron microscopic (SEM) image of the first side (roller side) of the membrane according to Example 3 at 2000× magnification.

Figure 2:
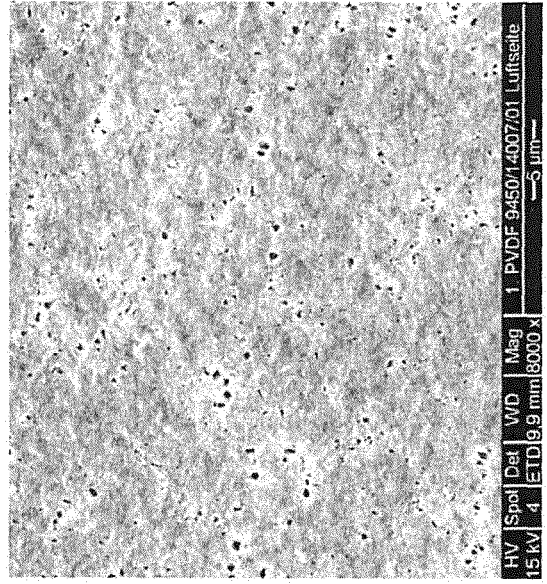

FIG. 2: SEM image of the first side (roller side) of the membrane according to Example 3 at 8000× magnification.

Figure 3:
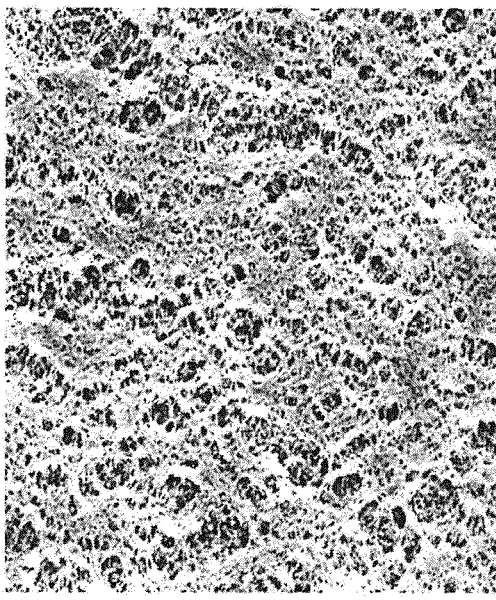

FIG. 3: SEM image of the second side (air side) of the membrane according to Example 3 at 2000× magnification.

Figure 4:
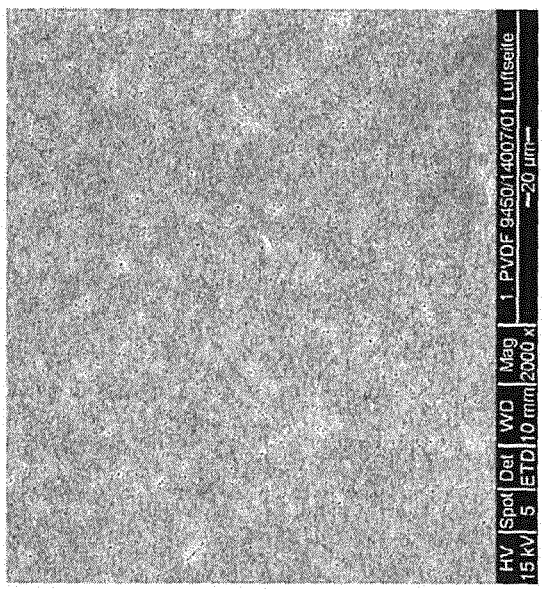

FIG. 4: SEM image of the second side (air side) of the membrane according to Example 3 at 8000× magnification.

Figure 5:
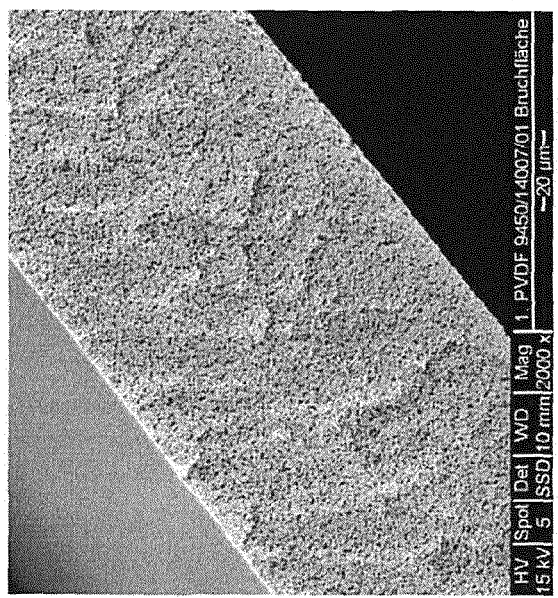

FIG. 5: SEM image of a cross-section across the wall of the membrane according to Example 3 at 2000× magnification.

Figure 6:
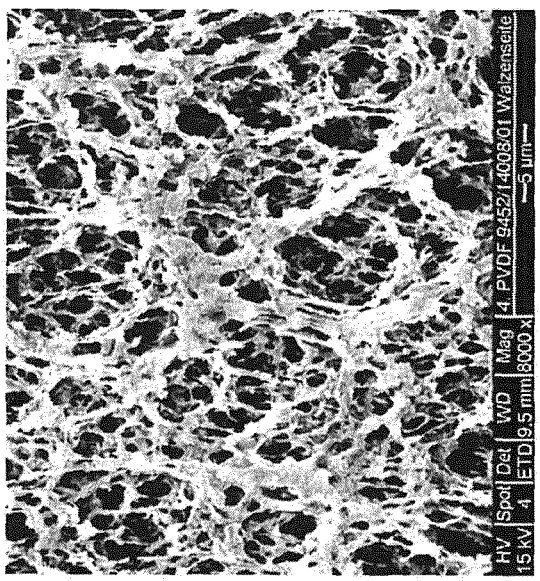

FIG. 6: SEM image of the first side (roller side) of the membrane according to Example 5 at 8000× magnification.

Figure 7:
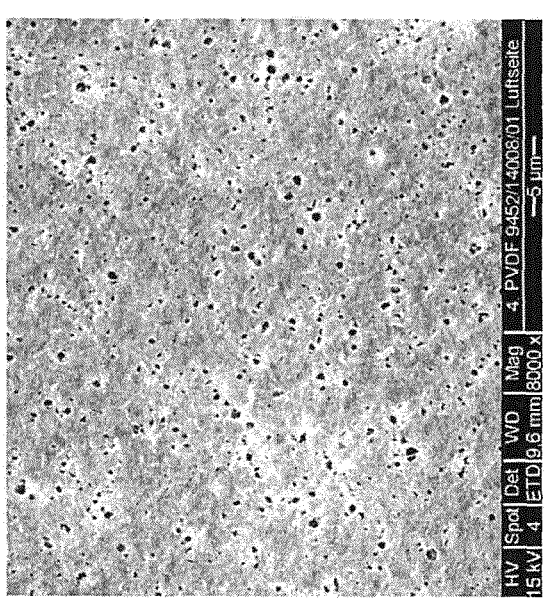

FIG. 7: SEM image of the second side (air side) of the membrane according to Example 5 at 8000× magnification.

Figure 8:
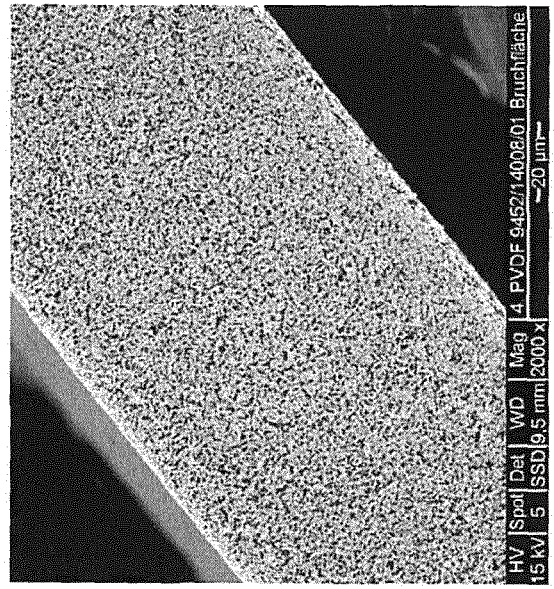

FIG. 8: Scanning electron microscopic (SEM) image of a cross-section across the wall of the membrane according to Example 5 at 2000× magnification.

Figure 9:
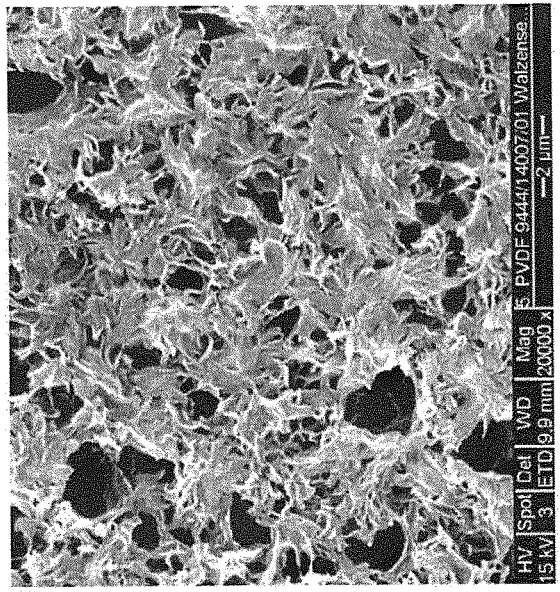

FIG. 9: SEM image of the first side (roller side) of the membrane according to Comparison example 1 at 2000× magnification.

Figure 10:
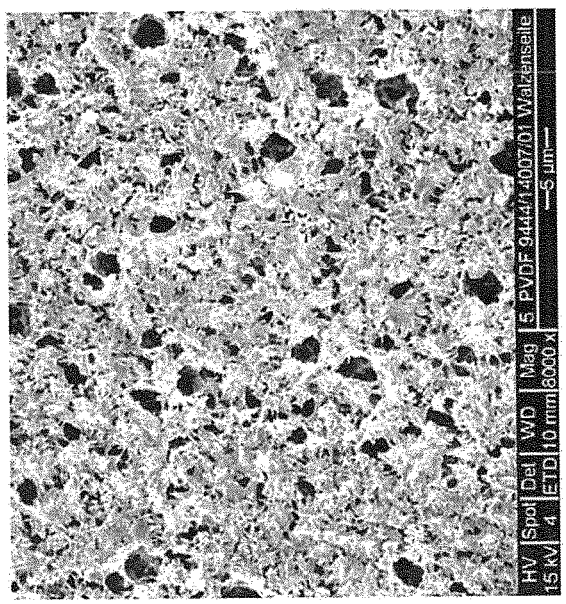

FIG. 10: SEM image of the first side (roller side) of the membrane according to Comparison example 1 at 8000× magnification.

Figure 11:
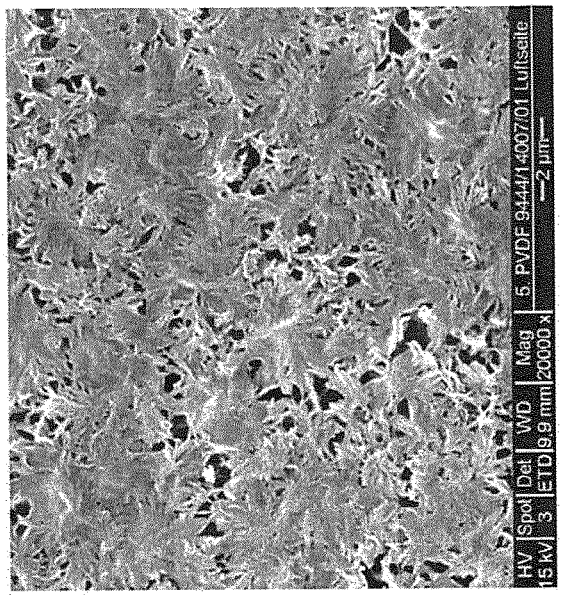

FIG. 11: SEM image of the second side (air side) of the membrane according to Comparison example 1 at 2000× magnification.

Figure 12:
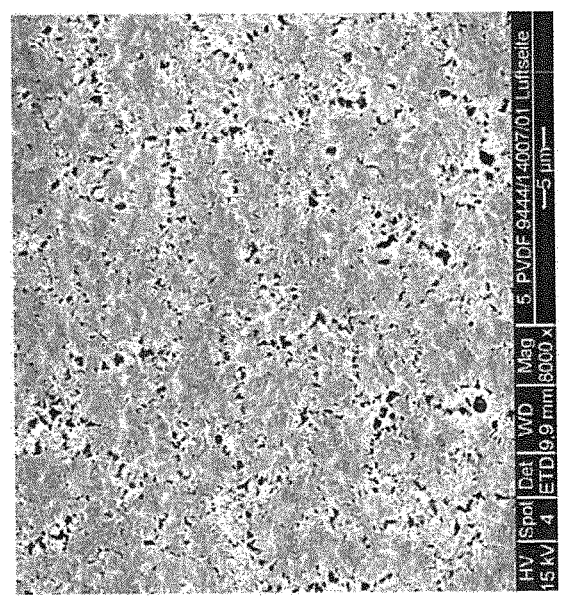

FIG. 12: SEM image of the second side (air side) of the membrane according to Comparison example 1 at 8000× magnification.

To determine the properties of the flat membrane according to the invention, the following methods were used:

Maximum Separating Pore:

The diameter of the maximum separating pore is determined by means of the bubble point method (ASTM No. 128-99 and F 316-03), for which the method described in DE-A-36 17 724 is suitable. Thereby, $d_{max}$ results from the vapor pressure $P_B$ associated with the bubble point according to the equation $$d_{max} = \sigma_B / P_B$$

where $\sigma_B$ is a constant that is primarily dependent on the wetting liquid used during the measurement. For IPA, $\sigma_B$ is 0.61 μm·bar at 25° C.

Transmembrane Flow for Isopropyl Alcohol (Permeability for IPA):

Disc-shaped membrane samples are stamped out of the membrane to be tested and then clamped fluid-tight at the perimeter in a suitable sample holder such that a free measuring area of 17.35 cm² results. The sample holder is located in a test cell through which isopropyl alcohol (IPA) can flow under pressure.

The test cell is incorporated in a testing apparatus and subjected to a flow of isopropyl alcohol (IPA) ultrapure, conditioned to 25° C. at a defined test pressure (approx. 0.2 bar). The filtered IPA volume obtained during a measuring time of 2 minutes, i.e. the permeate generated during measurement, is determined gravimetrically or volumetrically. Before measurement is begun, the system must be purged of air. In order to determine the TMF, the input and output pressure is measured on the test cell in the testing apparatus. The measurement is performed at 25° C.

The transmembrane flow, TMF, is determined according to formula (III)

$$TMF = \frac{V_W}{\Delta t \cdot A_M \cdot \Delta p} \left[ \frac{ml}{cm^2 \cdot min \cdot bar} \right] \quad (III)$$

where:
$V_W$=volume of IPA [ml] flowing through the membrane sample during the measuring period
$\Delta t$=measuring time [min]
$A_M$=area of the membrane sample penetrated (17.35 cm²)
$\Delta p$=pressure set during the measurement [bar]

Transmembrane Flow for Water Vapor:

The measurement of the transmembrane flow for water vapor is performed on a flat membrane module with a test surface of 40 cm². Two liquid circuits are connected to this flat membrane module, wherein the feed stream (salt water circuit) is connected to the flat membrane module in such a way that it flows along one side of the flat membrane to be tested. The distillate circuit absorbing the permeate flows through the flat membrane module on the other side of the flat membrane. The starting volumes of the circuits were each 1.6 l. During measurement, the distillate circuit continually increases as a result of the added permeate. The salt water circuit has a salt content of 36±0.5 g/l, which is kept constant by conductivity measurement while adding deionized water.

The volume flow in both circuits is set to 200 l/h±5%, wherein the circuits are guided in counter-current flow with respect to each other. The distillate circuit is conditioned to a temperature of 30° C. and the salt water circuit to a temperature of 80° C. Both circuits are kept at the same pressure level, with a pressure of 500 mbar set at the respective inlet to the flat membrane module.

In order to determine the transmembrane flow for water vapor, the increase in weight in the distillate circuit is determined gravimetrically over time. The minimum measurement time is 15 minutes.

The transmembrane flow for water vapor in l/(m²·h) is determined as the increase in weight, or the resulting increase in volume per time unit, referred to the current membrane surface (inner surface) of the flat membrane module used.

Force and Elongation at Break:

Measuring the force at break of the membrane takes place using a standard, universal testing machine from Zwick (Ulm, Germany). For this purpose, samples are cut from the flat membrane to be tested, the edges thereof oriented in the production direction and transverse to the production direction. The samples have a width of 15 mm and are clamped in the testing machine such that a free length of 25 cm results.

The membrane samples are stretched at constant speed in the longitudinal direction or in the transverse direction of the samples until break. The force required for this is measured as a function of the change in length and retained in a force/elongation curve. The measurement takes place as multiple determinations on five membrane samples at 100 mm clamping length and at a traction speed of 500 mm/min. The pretension weight is 2.5 cN. The measurement is performed at room temperature.

The force required for breaking, BK, is determined as the average numeric value in cN and the elongation at rupture achieved thereby as a % of the original length. The breaking strength $\sigma_B$ of the membrane sample in cN/mm$^2$ is obtained by standardizing the breaking force BK to the cross-sectional area $A_Q$ of the membrane wall, which results from the sample width and the membrane thickness.

Molecular Weight, Polydispersivity:

The determination of the molecular weight and the mole mass distribution (polydispersivity) takes place using gel permeation chromatography (GPC; columns: PSS GRAM: 10 µm, G, 30, 100, 3000 Å) on polystyrene standards with N-methyl-2-pyrrolidone (NMP)/0.01M LiCl as the eluent, and at a flow rate of 1 ml/min. The sample concentration is 3 mg/ml, and the injection volume is 100 µl (injection system TSP AS 3000). The oven temperature is set to 70° C., and the detection takes place with the Shodex RI 71 differential refractometer. The number average $M_N$ and the weighted average $M_W$ of the molar mass distribution are determined from the molar mass distribution using conventional methods. The dispersivity results from the ratio of the weight average $M_W$ to the number average $M_N$, thus $M_W/M_N$.

Pore Size in the Surfaces:

The determination of the average diameter of the pores in the surfaces takes place using image analysis methods based on scanning electron microscope images of the surfaces at 500× magnification (outer surface) or 2000× magnification (inner surface). The scanning electron microscope images of the surfaces were also used to assess the ratio of the longitudinal extension of the pores to the transverse extension thereof.

Volume Porosity:

A sample of at least 0.5 g of the membrane to be examined is dry weighed. The membrane sample is subsequently placed in a liquid that moistens the membrane material, however without causing swelling, for 24 hours such that the liquid penetrates into all pores. For the present PVDF membranes, a silicone oil with a viscosity of 200 m Pa s at 25° C. (Merck) is used. The permeation of liquid into the membrane pores is visually discernable in that the membrane sample changes from an opaque to a glassy, transparent state. The membrane sample is subsequently removed from the liquid, liquid adhering to the membrane sample is removed by centrifuging at approx. 1800 g, and the mass of the thus pretreated wet, i.e. liquid-filled, membrane sample is determined by weighing.

The volume porosity ε is determined according to the following formula:

$$\text{Volume porosity } \varepsilon = \frac{(m_{wet} - m_{dry})/\rho_{liquid}}{(m_{wet} - m_{dry})/\rho_{liquid} + m_{dry}/\rho_{polymer}}$$

where:
$m_{dry}$=weight of the dry membrane sample after wetting and drying [g]
$m_{wet}$=weight of the wet, liquid-filled membrane sample [g]
$\rho_{liquid}$=density of the liquid used [g/cm$^3$]
$\rho_{polymer}$=density of the membrane polymer [g/cm$^3$]

EXAMPLES 1-4

A mixture of PVDF powders of type Hylar 461 and Solef 6020 from Solvay Solexis (mixture ratio 50:50) was melted in an extruder at 235-245° C. The polymer melt was mixed in a mixer with a solvent system consisting of 40 wt. % glyceryl triacetate (component A) and 60 wt. % dioctyl adipate (component B) at 230-245° C. and subsequently processed to form a homogeneous solution. The polymer proportion was set at 25.5 wt. %. The PVDF mixture used in the casting solution had a weighted-average molecular weight $M_W$ of 457 000 daltons and a polydispersivity $M_W/M_N$ of 6.92.

The finished casting solution was poured by means of a sheeting die conditioned to 210° C. onto a conditioned metal casting roller to form a film with a thickness of approximately 100 µm. The temperature of the casting roller was varied between 40 and 70° C. The film located on the casting roller was fed through a climate-controlled zone with a climate of approximately 23° C. and 55% relative humidity and drawn off the casting roller after solidification. The residence time of the film on the casting roller was approximately 10 s.

The film thus obtained was extracted with isopropyl alcohol at a temperature of approximately 60° C. to remove the solvent system and then dried in a convection oven at a temperature of 80° C.

The properties of the flat membranes thus obtained are summarized in Table 1.

TABLE 1

| | Temperature of casting roller | TMF ml/(cm$^2$ · min · bar) | $d_{max}$ µm | Thickness µm |
|---|---|---|---|---|
| Example 1 | 40° C. | 3.08 | 0.28 | 92 |
| Example 2 | 50° C. | 3.51 | 0.36 | 95 |
| Example 3 | 60° C. | 4.41 | 0.46 | 93 |
| Example 4 | 70° C. | 5.04 | 0.51 | 92 |

The weight-average molecular weight $M_W$ and polydispersivity $M_W/M_N$ of the PVDF component contained in the flat membranes thus produced substantially corresponded to those of the starting material.

For the membrane according to Example 3, a transmembrane flow for water vapor of 55.6 l/(m$^2$·h) as well as a breaking strength of 350 cN/mm$^2$ in the longitudinal direction and 385 cN/mm$^2$ in the transverse direction were determined. The elongation at break of this membrane was 74.1% in the longitudinal direction and 119.7% in the transverse direction. The volume porosity was in the range 75-80 vol. %.

FIGS. 1 to 4 show scanning electronic microscopic (SEM) images of the surfaces of the membrane according to Example 3 at 2000× and 8000× magnification.

The SEM images of the surface of the membrane which was against the casting roller during production of the membrane (roller side, first side of the membrane) exhibit a pronounced network structure with open pores at 2000× and 5000× magnification, in which spaces between in part filament-like webs form a pore system (FIG. 1, 2). The SEM images at 2000× and 5000× magnification of the surface of the membrane that was exposed to the air during production of the membrane (air side, second side of the membrane) show a uniform and relatively even structure of the surface, which has island-shaped pores (FIG. 3, 4). The pores have an irregular shape but do not exhibit a preferred orientation.

A comparison of FIG. 2 with FIG. 4 shows that the pores of the flat membrane according to Example 3 in the first surface are larger than the pores in the second surface.

FIG. 5 shows an SEM image of a cross-section across the wall of the flat membrane according to Example 3 at 2000× magnification. In the cross-section adjacent to the second surface (top left of image, air side), a fine-pored supporting layer is evident, which essentially extends over the entire cross-section and has an isotropic pore structure without a gradient across the wall thickness with regard to the pore size. The average diameter of the pores in the supporting layer lies below 1 µm.

EXAMPLES 5-6

The procedure was the same as in Examples 1 and 2. Unlike Examples 1 and 2, however, a mixture of PVDF types Hylar 461 and Solef 6020 was used in a mixture ratio of 30:70. The resulting polymer component had a weight-average molecular weight $M_W$ of 355 000 daltons and a polydispersivity $M_W/M_N$ of 7.84.

The properties of the flat membranes according to Examples 5 and 6 are summarized in Table 2.

TABLE 2

| | Temperature of casting roller | TMF ml/(cm² · min · bar) | $d_{max}$ µm | Thickness µm | TMF Water vapor l/(m² · h) |
|---|---|---|---|---|---|
| Example 5 | 40° C. | 6.73 | 0.45 | 89 | 64.4 |
| Example 6 | 50° C. | 6.80 | 0.44 | 84 | 61.7 |

The flat membrane according to Example 5 had a breaking strength of 298 cN/mm² in the longitudinal direction and 396 cN/mm² in the transverse direction. The elongation at break of this membrane was 74.9% in the longitudinal direction and 77.4% in the transverse direction. For the flat membrane according to Example 6, a breaking strength of 365 cN/mm² in the longitudinal direction and 487 cN/mm² in the transverse direction were determined. The elongation at break of this membrane was 96.5% in the longitudinal direction and 139.7% in the transverse direction.

FIGS. 6 and 7 show scanning electronic microscopic (SEM) images of the surfaces of the membrane according to Example 5 at 8000× magnification. The SEM image of the surface of the membrane according to Example 5 which was against the casting roller during production of the membrane (roller side, first side of the membrane) has, as in the previous Example 3, a pronounced network structure with open pores, in which spaces between in part filament-like webs form a pore system (FIG. 6). The SEM image of the surface of the membrane that exposed to the air during production of the membrane (air side, second side of the membrane) shows a uniform and relatively even structure of the surface, which has island-shaped pores (FIG. 7). The pores have an irregular shape but do not exhibit a preferred orientation. A comparison of FIG. 6 with FIG. 7 shows that the pores of the flat membrane according to Example 5 in the first surface are larger than the pores in the second surface.

FIG. 8 shows an SEM image of a cross-section across the wall of the flat membrane according to Example 5 at 2000× magnification. Here again, in the cross-section adjacent to the second surface (top left of image, air side), a fine-pored supporting layer is evident, which essentially extends over the entire cross-section and has an isotropic pore structure without a gradient across the wall thickness with regard to the pore size. The average diameter of the pores in the supporting layer lies below 1 µm.

For the flat membrane according to Example 6, a similar image results with regard to the surfaces and the cross-section, dispensing with the need for a separate presentation.

EXAMPLE 7

The procedure was the same as in Example 1. Unlike in Example 1, however, a solvent system consisting of 35 wt. % glyceryl triacetate (component A) and 65 wt. % dioctyl adipate (component B) was used. The casting roller temperature was 40° C. as in Example 1.

The properties of the flat membranes according to Example 7 are summarized in Table 3.

TABLE 3

| | Temperature of casting roller | TMF ml/(cm² · min · bar) | $d_{max}$ µm | Thickness µm | TMF Water vapor l/(m² · h) |
|---|---|---|---|---|---|
| Example 7 | 40° C. | 5.69 | 0.39 | 100 | 55.7 |

The flat membrane according to Example 7 had a breaking strength of 320 cN/mm² in the longitudinal direction and 355 cN/mm² in the transverse direction. The elongation at break of this membrane was 69.7% in the longitudinal direction and 87.3% in the transverse direction.

COMPARISON EXAMPLE 1

The procedure was the same as in Example 1. Deviating from Example 1, a solvent system consisting of 60 wt. % glyceryl triacetate (component A) and 40 wt. % dioctyl adipate (component B) was used. The casting roller temperature was also 40° C. as in Example 1.

The properties of the flat membranes according to Comparison example 1 are shown in Table 4.

TABLE 4

| | Temperature of casting roller | TMF ml/(cm² · min · bar) | $d_{max}$ µm | Thickness µm | TMF Water vapor l/(m² · h) |
|---|---|---|---|---|---|
| Comparison example 1 | 40° C. | 1.32 | 0.90 | 96 | 31.8 |

The flat membrane according to Comparison example 1 had a breaking strength of 437 cN/mm² in the longitudinal direction and 413 cN/mm² in the transverse direction. The elongation at break of this membrane was 119.1% in the longitudinal direction and 111.2% in the transverse direction.

As proven by the scanning electronic microscopic (SEM) images of the surfaces of the membrane according to Comparison example 1 at 2000× and 8000× magnification, the membrane according to comparison example 1 has a first and a second surface (roller side and air side) with a pronounced spherulitic structure (FIG. 9-12). In particular in the first surface, a structure clearly differing from the inventive network-like surface structure is evident, in which the particulate or spherulitic segments are in part connected to each other by fibrils. The second side of the membrane according to this comparison example has an increased roughness due to its spherulitic structure.

COMPARISON EXAMPLES 2-5

The procedure was the same as in Examples 1 to 4. Deviating from Examples 1 to 4, however, the PVDF type Solef 6020 was used in a proportion of 100% as the polymer component. For the PVDF type Solef 6020, a weight-average molecular weight $M_W$ of 552 000 daltons and a polydispersivity $M_W/M_N$ of 5.1 were determined.

The properties of the flat membranes according to Comparison examples 2 to 5 are summarized in Table 5.

TABLE 5

| | Temperature of casting roller | TMF ml/(cm² · min · bar) | $d_{max}$ µm | Thickness µm |
|---|---|---|---|---|
| Comparison example 2 | 40° C. | 1.29 | 0.90 | 94 |
| Comparison example 3 | 50° C. | 1.81 | 0.90 | 89 |
| Comparison example 4 | 60° C. | 1.81 | 0.43 | 96 |
| Comparison example 5 | 70° C. | 2.62 | 0.39 | 95 |

For the membrane according to Comparison example 3, a transmembrane flow for water vapor of 51.1 l/(m²·h) as well as a breaking strength of 381 cN/mm² in the longitudinal direction and of 662 cN/mm² in the transverse direction were determined. The elongation at break of this membrane was 93.3% in the longitudinal direction and 232.4% in the transverse direction. The volume porosity for the flat membranes according to Comparison examples 2 to 5 was also in the range from 75 to 80 vol. %.

The invention claimed is:

1. A hydrophobic membrane comprising a flat membrane made from a vinylidene fluoride polymer, wherein the hydrophobic membrane has a wall with a wall thickness, a first surface, and a second surface,
   wherein the first surface of the hydrophobic membrane comprises a network structure in which spaces between filaments made from a polymer material form a pore system;
   wherein the second surface of the hydrophobic membrane comprises a continuous skin in which pores are formed in an island-sea structure, the pores in the second surface having a closed perimeter in the plane of the continuous skin; and wherein the second surface island-sea structure is different from the first surface network structure;
   wherein the hydrophobic membrane between the first surface and the second surface has a supporting layer, the supporting layer having an open-pored, microporous, and sponge-like pore structure that is substantially isotropic across the wall thickness, the supporting layer extending over at least 80% of the wall thickness and comprising pores having an average diameter of less than 1 µm, and wherein
   the vinylidene fluoride polymer forming the hydrophobic membrane has a weight-average molecular weight MW in the range from 300,000 to 500,000 daltons and a polydispersity MW/MN, given by the ratio of the weight-average molecular weight MW and the number average MN of the molecular weight, that is greater than 5.5,
   the pores in the skin of the second surface having an average ratio of the extension in the direction of the longest axis thereof to the extension in the direction of the shortest axis thereof of at most 5, and the pores in the first surface and second surface having an essentially isotropic distribution of their orientation when viewed perpendicular to the surface,
   the porosity of the hydrophobic membrane lies in the range from 50 to 90 vol. % and the wall thickness in the range from 50 to 300 µm,
   the hydrophobic membrane has a maximum separating pore diameter dmax in the range from 0.1 to 1 µm determined according to the bubble point method, and
   the hydrophobic membrane having a contact angle on the second surface for water greater than 90 degrees.

2. The hydrophobic membrane according to claim 1, wherein the hydrophobic membrane has a transmembrane flow for isopropyl alcohol in the range from 3 to 15 ml/(cm²·min·bar), measured at 25° C.

3. The hydrophobic membrane according to claim 1, wherein the hydrophobic membrane has a transmembrane flow for water vapor of at least 35 l/(m²·h), determined by means of a flat membrane module with a membrane area of 40 cm² at a salt water circuit temperature of 80° C. and a distillate circuit temperature of 30° C., a volume flow in the circuits of 200 l/h, a pressure level in the circuits of 500 mbar at the inlet to the flat membrane module, and a salt concentration in the salt circuit of 36 g/l.

4. The hydrophobic membrane according to claim 1, wherein the hydrophobic membrane has an elongation at break of at least 50% at room temperature.

5. The hydrophobic membrane according to claim 1, wherein the hydrophobic membrane has a breaking strength of at least 200 cN/mm² at room temperature.

6. The hydrophobic membrane according to claim 1, wherein the membrane has a volume porosity in the range from 70 to 85 vol. %.

7. The hydrophobic membrane according to claim 1, wherein the hydrophobic membrane has a wall thickness in the range from 60 to 150 µm.

8. The hydrophobic membrane of claim 1 wherein the hydrophobic membrane does not contain any hydrophilic additives.

9. The hydrophobic membrane of claim 8 wherein the hydrophobic membrane does not contain any polyvinylpyrrolidone.

10. A method for producing the flat membrane according to claim 1 from a vinylidene fluoride homopolymer or copolymer, comprising at least the following steps:
   a) preparing a homogeneous casting solution of 20-30 wt. % of a polymer component made from at least one vinylidene fluoride polymer in 80-70 wt. % of a solvent system, wherein the homogeneous casting solution of the polymer component and solvent system has on cooling a critical demixing temperature and a solidification temperature, and a miscibility gap below the critical demixing temperature in a liquid state of aggregation, and wherein the solvent system contains a compound A, and a compound B, which are liquid and can be mixed homogeneously with each other at a dissolving temperature, and wherein a solvent for the polymer component is selected for compound A, and compound B is a non-solvent for the polymer component,
   b) forming of the homogeneous casting solution into a film with the first surface and the second surface in a forming tool, which has a tool temperature above the critical demixing temperature, and
   c) placing the first surface of the film onto a conditionable carrier, which is conditioned to a cooling temperature below the solidification temperature, resulting in cooling of the film via the conditionable carrier at a rate such that a thermodynamic non-equilibrium liquid-liquid phase separation into a polymer-rich phase and a polymer-poor phase takes place, and subsequently, on passing below the solidification temperature, solidification of the polymer-rich phase takes place, forming a membrane structure; at the same time d) bringing the second surface of the film into contact with a gaseous atmosphere, e) drawing the film with the formed membrane structure from the conditionable carrier, f) removing at least part of the solvent system from the film to obtain the flat membrane, and wherein the polymer component has a weight-average molecular weight MW in the range from 300,000 to 500,000 daltons and a polydispersity MW/MN, given by the ratio of the weight-average molecular weight MW and the number average MN of the molecular weight, that is greater than 5.5.

11. The method according to claim 10, wherein glyceryl triacetate, glyceryl diacetate, 2-(2-butoxyethoxy-)ethyl acetate, dibutyl phthalate, adipic acid diethyl ester, adipic acid dibutyl ether, butyl diglycol acetate, butyl glycol acetate, glycol diacetate, propylene carbonate, butyrolactone, or ε-caprolactam, or a mixture of the compounds mentioned, is used as compound A.

12. The method according to claim 10, wherein dioctyl adipate, glyceryl monoacetate, glycerol, glycol, diglycol, or castor oil, or a mixture thereof, is used as compound B.

13. The method according to claim 10, wherein the conditionable carrier has a temperature in the range from 30 to 80° C.

14. The method according to claim 10, wherein the gaseous atmosphere has a temperature in the range from 20 to 25° C.

15. The method according to claim 10, wherein the conditionable carrier is a conditionable and rotating casting roller, which with a part of its perimeter on a bottom is immersed in a bath filled with a liquid cooling medium.

16. The method according to claim 15, wherein the liquid cooling medium comprises a solvent and a non-solvent for the polymer component, and wherein the cooling medium acts as a non-solvent for the polymer component at the cooling temperature.

* * * * *

UNITED STATES PATENT AND TRADEMARK OFFICE
CERTIFICATE OF CORRECTION

PATENT NO. : 10,960,362 B2
APPLICATION NO. : 15/520221
DATED : March 30, 2021
INVENTOR(S) : Quan Huang It is certified that error appears in the above-identified patent and that said Letters Patent is hereby corrected as shown below:

On the Title Page

Column 2 item [56]
Line 6, Delete "chlorotrifluoroenthylene)" and insert -- chlorotrifluoroethylene) --, therefor.

Column 2 item [56]
Line 30, Delete "300 000 to 500 000" and insert -- 300,000 to 500,000 --, therefor.

Column 2 item [56]
Line 31, Delete "polydispersity" and insert -- polydispersivity --, therefor.

In the Specification

Column 8
Line 32, Delete "Ml/" and insert -- ml/ --, therefor.

Column 17
Line 47, Delete "c" and insert -- $\varepsilon$ --, therefor.

In the Claims

Column 21
Line 52, Claim 1, Delete "MW" and insert -- $M_W$ --, therefor.

Column 21
Line 54, Claim 1, Delete "polydispersity MW/MN" and insert -- polydispersivity $M_W/M_N$ --, therefor.

Column 21
Line 55, Claim 1, Delete "MW" and insert -- $M_W$ --, therefor.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*

Column 21
Line 56, Claim 1, Delete "MN" and insert -- $M_N$ --, therefor.

Column 22
Line 2, Claim 1, Delete "dmax" and insert -- $d_{max}$ --, therefor.

Column 23
Line 10, Claim 10, Delete "MW" and insert -- $M_W$ --, therefor.

Column 23
Line 11, Claim 10, Delete "polydispersity MW/MN" and insert -- polydispersivity $M_W/M_N$ --, therefor.

Column 23
Line 12, Claim 10, Delete "MW" and insert -- $M_W$ --, therefor.

Column 23
Line 13, Claim 10, Delete "MN" and insert -- $M_N$ --, therefor.